United States Patent [19]

Knödel et al.

[11] Patent Number: 4,640,141
[45] Date of Patent: Feb. 3, 1987

[54] GEARBOX-TRANSMISSION WITH SYNCHRONIZED REVERSE-GEAR

[75] Inventors: Gunter Knödel, Mühlacker; Georg Helms, Ludwigsburg, both of Fed. Rep. of Germany

[73] Assignee: GETRAG Getriebe- und Zahnradfabrik GmbH, Ludwigsburg, Fed. Rep. of Germany

[21] Appl. No.: 532,077

[22] Filed: Sep. 14, 1983

[30] Foreign Application Priority Data

Jun. 7, 1983 [DE] Fed. Rep. of Germany ....... 3320494

[51] Int. Cl.⁴ .............................................. F16H 3/08
[52] U.S. Cl. ........................................ 74/357; 74/358; 74/359; 74/360
[58] Field of Search .................. 74/356, 357, 358, 359, 74/339, 340

[56] References Cited

U.S. PATENT DOCUMENTS

| | | | |
|---|---|---|---|
| 2,220,541 | 11/1940 | Peterson | 74/339 X |
| 2,506,670 | 5/1950 | Kamlukin | 74/359 |
| 3,163,053 | 12/1964 | Peras | 74/359 |
| 3,196,703 | 7/1965 | Sinclair et al. | 74/339 |
| 3,318,167 | 5/1967 | Frost | 74/356 X |
| 4,000,662 | 1/1977 | Wolfe | 74/331 |
| 4,065,981 | 1/1978 | Whateley et al. | 74/410 |
| 4,174,644 | 11/1979 | Nagy et al. | 74/339 X |
| 4,399,717 | 8/1983 | Funato et al. | 74/339 |
| 4,409,857 | 10/1983 | Lasoen | 74/339 X |
| 4,416,168 | 11/1983 | Arai et al. | 74/781 R X |
| 4,461,188 | 7/1984 | Fisher | 74/356 X |
| 4,488,446 | 12/1984 | Nishikawa et al. | 74/358 X |

FOREIGN PATENT DOCUMENTS

| | | |
|---|---|---|
| 409751 | 1/1968 | Australia . |
| 208230 | 8/1959 | Austria . |
| 265373 | 10/1913 | Fed. Rep. of Germany . |
| 1188449 | 3/1965 | Fed. Rep. of Germany . |
| 1945721 | 9/1969 | Fed. Rep. of Germany . |
| 2904061 | 7/1980 | Fed. Rep. of Germany ........ 74/331 |
| 2904062 | 7/1980 | Fed. Rep. of Germany ........ 74/331 |
| 3033625 | 4/1982 | Fed. Rep. of Germany . |
| 2422875 | 4/1979 | France . |
| 58-84247 | 5/1983 | Japan ................................. 74/356 |
| 1351770 | 5/1974 | United Kingdom ................. 74/357 |
| 2018371 | 10/1979 | United Kingdom ................. 74/357 |
| 2031531 | 4/1980 | United Kingdom . |

*Primary Examiner*—Leslie A. Braun
*Assistant Examiner*—Dwight G. Diehl
*Attorney, Agent, or Firm*—Pravel, Gambrell, Hewitt & Kimball

[57] ABSTRACT

A gearbox-transmission, especially for power vehicles, with synchronized reverse gear, an intermediate-gearwheel providing for the reversal of direction consists of two loose-gearwheels located on the same axis which is beside the input and output shafts, of which the one loose gearwheel engages the input-shaft via a loose-gearwheel and the fixed-gearwheel of one forward-gear, and the other engages the output-shaft via the loose-gearwheel and the fixed-gearwheel of another forward-gear. The two reverse gear loose-gearwheels are connectable with each other by means of a shift-clutch. In this way no additional gearwheels are needed on the input- and output-shaft for the reverse-gear so that the structural length of such a transmission can correspondingly be reduced.

5 Claims, 3 Drawing Figures

GEARBOX-TRANSMISSION WITH SYNCHRONIZED REVERSE-GEAR

FIELD OF THE INVENTION

The invention concerns a gearbox-transmission, especially for motor vehicles, with an input-shaft and an output-shaft, several synchronized foward-gears and one synchronized reverse-gear, which has an intermediate-gearwheel shaft and gearwheels for the reversal of direction with an axis parallel to the input-shaft and the output-shaft, which intermediate-gearwheels engage associated gearwheels on the input and output shafts.

DESCRIPTION OF PRIOR ART

Gearbox-transmissions are known in many designs. The fundamental structure of such transmissions is described, for example, in Bussien's "Handbook of Automobile Technology" (Berlin, 1965), Vol. 2, pp. 230 ff. One distinguishes between gearbox-transmissions with countershaft-design and those with two-shaft-design, which differ in that in the first case a shaft connected to the motor drives a countershaft parallel to it on which there are gearwheels which engage qearwheels on the output-shaft, which in turn is arranged co-axial to the shaft which can be connected to the motor-shaft, whereas in the second case the input-shaft which is connectable to the motor is arranged parallel to the output-shaft, but otherwise, like the countershaft, has gearwheels which engage the gearwheels located on the output-shaft. Common to both types of transmission is the fact that the gearwheels associated with the individual gear-speed "first gear", etc., including the reverse-gear, are located along the output-shaft, so that each additional gear-speed increases the length of such a transmission. This is true whether the switching-members for the individual gear-speeds, which are usually located between the gear-wheels associated with the two adjacent gear-speeds, are all on the output-shaft, or whether they are located partially on the input-shaft and partially on the output-shaft, as is customary in transmissions of the two-shaft design.

The space available in motor vehicles for the installation of the transmission is often very limited. Thus, in modern automobile construction, two opposing demands are in conflict with each other, i.e., the demand for the installation of a 5-speed-transmission as standard and the demand for a structurally short transmission, such as is particularly necessary for passenger-cars with transverse motor.

SUMMARY OF THE INVENTION

The basis of the invention is the task of designing a transmission which has a shorter structural length than has hitherto been possible, which thus allows the fulfillment of the demand for very short transmissions in spite of a high number of gear-speeds.

This task is solved by the invention in the following way. In the well-known manner the shifting-components for at least one forward-gear are located on the input-shaft and the shifting-components for at least one other forward-gear are located on the output-shaft; the reversal-gearwheel comprises two loose-gearwheels located on the same axis beside each other, of which the one engages the output-shaft via the fixed-gearwheel of the one forward-gear, and the other engages the input-shaft via the fixed-gearwheel of the other forward-gear. The two loose-gearwheels are connectable with each other by means of a shift-coupling.

In the transmission according to the invention, therefore, no further gearwheels besides the intermediate-gearwheel for the reverse-gear located beside the input and output-shafts are needed because the gear wheels which are already present for the forward-gears are utilized for the reverse-gear so that the total structural length of the reverse-gear can be shorter. In this manner, therefore, a decided shortening of the transmissions of conventional construction can be achieved thereby fulfilling the demand for a minimum length transmission.

The invention can be used in the same way for transmissions of either the countershaft-type or the two-shaft-type. It is, of course, self-evident that, in the present case, in transmissions of the countershaft-type the countershaft is to be considered the input-shaft, rather than the shaft which is connectable with the motor, which is located on the same axis as the output-shaft, and which serves to drive the countershaft. Correspondingly, then, in the case of a transmission of the countershaft-type, a shift-coupling must be located on the countershaft, which in accordance with what has been described above, corresponds to the input-shaft of transmissions of the two-shaft-type. The arrangement of shifting-components on the input and output-shafts is naturally well-known in the case of transmissions of the two-shaft-type, but is unusual in the case of transmissions of the countershaft-type.

By the selection of the forward-gears which are connectable to each other through the two-part intermediate gearwheels for shifting into reverse-gear, and through the selection of the size of the intermediate-gearwheels, the desired gear-ratio for the reverse-gear can be determined. It can be especially advantageous if the loose-gearwheels forming the intermediate-gearwheel in each case engage the loose-gearwheel of the associated forward-gear.

A favored design of the invention consists of a transmission of the two-shaft-type with at least four forward-speeds, in which the loose-gearwheels which form the intermediate-gearwheel engage the loose-gearwheels of the first and third forward-gears with the first gear being shifted on the output-shaft.

A special advantage of the transmission according to the invention consists in the fact that the shift-coupling between the two loose-gearwheels which form the intermediate-gearwheel can be installed with arbitrary direction of shifting. By this means, it is especially possible to choose the operational direction for the reverse-gear in such a way as to achieve whatever shifting-pattern is desired. And especially it is possible, in a transmission with five speeds, to select an arrangement so that the direction of movement of a gearshift-lever connected with the shift-couplings is the same for the engagement of the fifth-gear and of the reverse-gear.

In the following, the invention will be described and explained in greater detail, using the example of a possible application, as shown in the drawing. The characteristics to be noted from the description and the drawing may be used individually or in various arbitrary groupings in the case of other application.

DETAILED DESCRIPTION OF THE DRAWINGS

Figure 1:
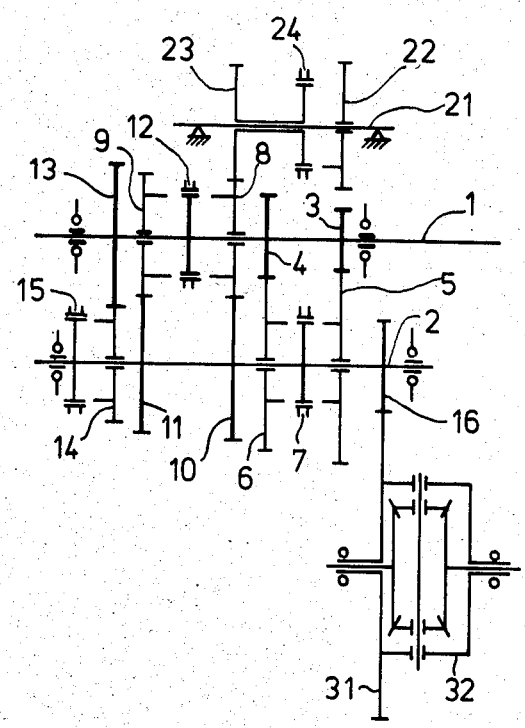
FIG. 1 shows the schematic representation of a five-speed transmission according to the invention.

The transmission shown schematically in FIG. 1 is a two-shaft transmission with an input-shaft 1, which is connectable with a motor, and an output-shaft 2, parallel to it. On the input-shaft 1 are located, axially one behind the other, two fixed gearwheels 3 and 4, which are allocated to the first and second gear-speed, respectively, and which engage corresponding loose-gearwheels 5 and 6, respectively, on the output-shaft 2. In order to engage the first gear 3 or the second gear 4, the two loose-gearwheels 5 and 6 can selectively be positively connected with the output-shaft 2 by means of the shifting-sleeve 7 of a synchronous unit.

On the input-shaft 1 there are located, besides the two fixed-gearwheels 3 and 4, two loose-gearwheels 8 and 9, which are allocated to the third and fourth gear and which engage in each case one fixed-gearwheel 10 or 11, respectively, on the output-shaft 2. In this case, for the engagement of the third or fourth gear, respectively, the loose-gearwheels 8 and 9 are selectively positively connectable with the input-shaft 1 by means of the shifting-sheeve 12 of a synchronous unit. On the input-shaft 1 a further fixed-gearwheel 13 is located, which engages a loose-gearwheel 14 on the output-shaft 2, which loose-gearwheel 14 is positively connectable with the output-shaft 2 by means of the shifting-sleeve 15 of another synchronous unit, in order thus to engage the fifth gear.

The gearwheels allocated to the individual gear-speeds are located in the usual way behind one another in the longitudinal direction of shafts 1 and 2, so that each addition of a gear-speed increases the length of the transmission. In the case of traditional transmissions, this is true also for the reverse gear. Although the transmission shown as an example of an application also has a reverse gear, the length of the transmission is not increased thereby.

Figure 2:
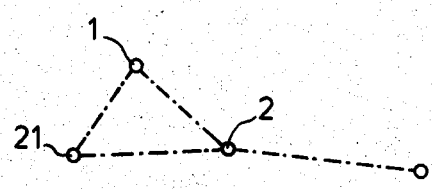
FIG. 2 shows a diagram representing the location of the shafts of the transmission along line 2—2 of FIG. 1.

Similarly as in traditional transmissions, for the direction reversal for the reverse gear an intermediate-gearwheel is mounted on the axis 21 parallel to the input- and output-shafts 1 and 2, respectively. Referring to FIG. 2, shafts 1 and 2 and axis 21 are located at the corners of a triangle so that a loose-gearwheel 22 mounted on axis 21 engages the loose-gearwheel 5 mounted on the output-shaft 2, which loose-gearwheel 5 is allocated to the first gear. A second loose-gearwheel 23 is mounted on axis 21 and engages the loose-gearwheel 8 mounted on the input shaft 1, which loose-gearwheel 8 is allocated to the third gear. Between the two loose-gearwheels 22 and 23 located on axis 21, there is a synchronous unit with a shifting-sleeve 24 which allows the positive connection of the two loose-gearwheels 22 and 23 with each other such that they form a common intermediate-gearwheel which transfers the rotation of the input-shaft 1 to the output-shaft 2, with a reversal of the turning direction. In this process the flow of power goes from the input-shaft 1 via the fixed-gearwheel 3 and the loose-gearwheel 5 of the first gear over to the loose-gearwheel 22, which forms a part of the intermediate-gearwheel, from there loose-gearwheel 22 via the shifting-sleeve 24 over to the second loose-gearwheel 23 of the intermediate-gearwheel, from which, finally, the flow of power reaches the output-shaft 2 via the loose-gearwheel 8 and the fixed-gearwheel 10 of the third gear. From the output-shaft 2, in the illustrated applicational example, the turning-motion is transferred via a gearwheel 16 to the gearwheel 31 of a differential-gearbox 32.

In the schematic shown in FIG. 1, the synchronous unit is rigidly connected with the loose-gearwheel 23 (on the left in FIG. 1) of the intermediate-gearwheel, so that the positive connection between the two loose-gearwheels 22 and 23 of the intermediate-gearwheel is produced by displacement of the shifting-sleeve 24 to the right. The shifting-sleeve 15 must also be moved in the same direction in order to positively connect the loose-gearwheel 14 of the fifth gear with the output-shaft 2. In this case the shifting apparatus for the transmission would have to have four shifting-rods, unless arrangements are utilized which make possible, by the use of a reversing-lever, the elimination of one shifting-rod; this is familiar, for example, from West German Pat. No. DE-PS 29 35 590.

The motion in the same direction for the engagement of the reverse gear and the fifth gear makes it possible to retain the usual four-speed-shifting-pattern for a five-speed-transmission and merely to supplement it by an additional shifting-gate, which is located on the side of the shifting-gates for gears one through four opposite from the reverse gear.

The illustrated transmission can, however, readily be adapted in such a way that the reverse gear and the fifth gear can be shifted on a common shifting-rod in opposite directions. For this purpose, it is sufficient to reverse the synchronous unit between the loose-gearwheels 22 and 23 of the intermediate-gearwheel, so that the shifting-sleeve of the synchronous unit connected to the loose-gearwheel 22, shown on the right in FIG. 1, of the intermediate-gearwheel axis 21, can be made, by displacement to the left, to engage with the second loose-gearwheel 23. Then, for the engagement of the reverse-gear and the fifth gear, motions in opposite directions are necessary.

Figure 3:
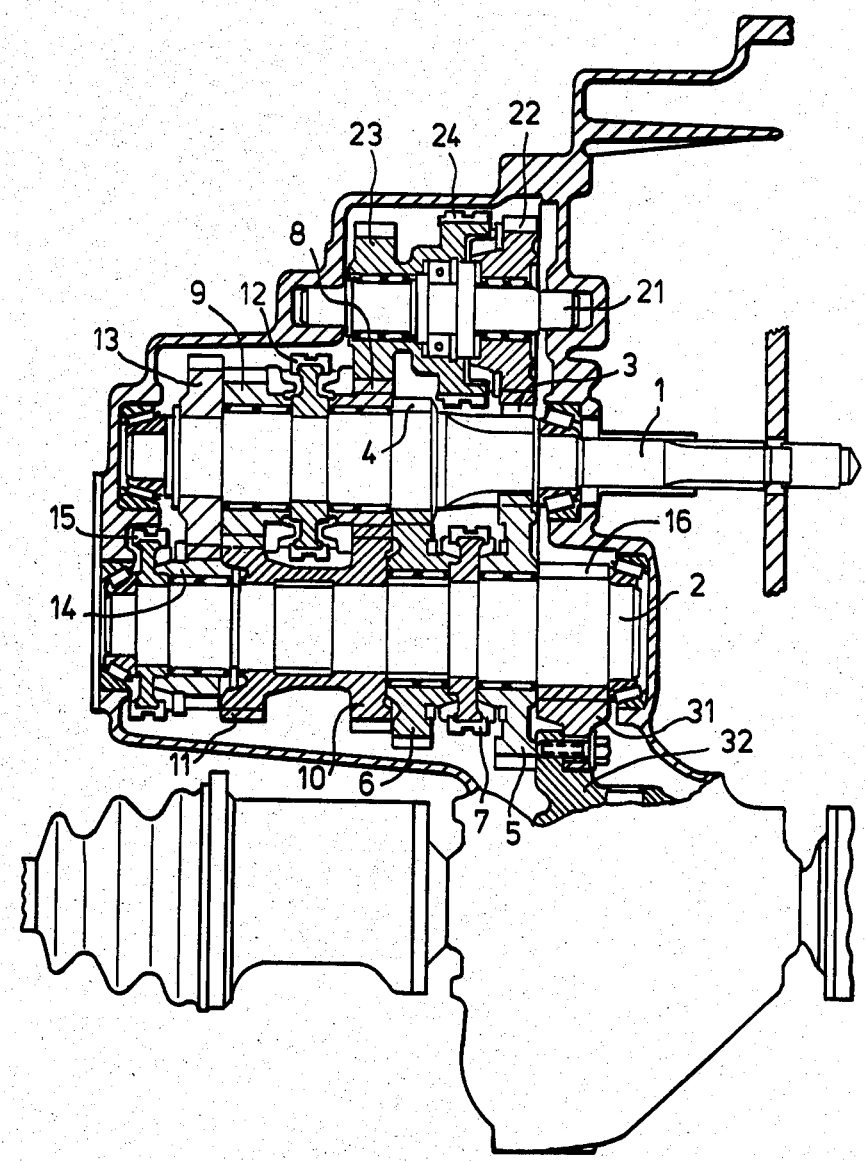
FIG. 3 shows a lengthwise-section through a practical application of the transmission given schematically in FIG. 1.

FIG. 3 illustrates the structural design execution of the transmission shown schematically in FIG. 1. The structural components explained in conjunction with FIG. 1 are provided with the same reference numbers in FIG. 3 as in FIG. 1. The description of the schematic representation as per FIG. 1 is therefore fully applicable to the structure as shown in FIG. 3, so that, to avoid repetition, reference is made to the description of FIG. 1.

It is self-evident that the invention is not limited to the illustrated embodiment, but that deviations are possible without leaving the scope of the invention. It is readily visible that the invention is applicable not only to five-speed-transmissions, but also to transmissions with fewer or more gears. For example, the gearwheels 13 and 14, allocated to the fifth gear, as well as the associated synchronous-unit with shifting sleeve 15, could readily be omitted, if only a four-speed transmission is needed. Furthermore, the invention is not limited to transmissions of the two-shaft type. Rather, for example, the transmission shown in FIG. 1 could be transformed into a transmission of the countershaft-type by providing an input-shaft coaxial to the output-shaft 2, which input-shaft would be connected via a pair of gearwheels with shaft 1, which then would become the countershaft. Thus, to this extent, the input-shaft of the illustrated transmission of the two-shaft type is equitable to the countershaft of a transmission of the countershaft-type. In this case, the usual direct connection could also be provided between the input-shaft and the output-shaft, located on the same axis.

It is furthermore self-evident that the loose-gearwheels forming the intermediate-gearwheel do not necessarily need to engage loose-gearwheels of the selected gears, but rather may directly engage fixed-gearwheels associated with selected gears provided only that these fixed-gearwheels are located on different shafts.

Finally, it would also be conceivable to provide a two-step transmission between the loose-gearwheel on one shaft associated with one gear and a fixed-gearwheel of another gear on the same shaft, which two-step transmission would contain the shift-coupling for the reverse-gear, if thereby advantages were obtained regarding the structural arrangement and the possible gear-ratio when the reverse gear is engaged. To this extent the design-engineer also has a choice of the gears between which the two-part intermediate-gearwheel, provided with the shift-coupling, or a two-step transmission is to be situated.

We claim:

1. A gearbox-transmission for motor vehicles, comprising:
    a first shaft;
    a second shaft arranged in parallel to the first shaft;
    a first gearwheel fixed to the first shaft;
    a second gearwheel rotatably mounted to the second shaft and engaging the first gearwheel;
    means for fixing the second gearwheel to the second shaft to provide a first forward gear;
    a third gearwheel rotatably mounted to the first shaft;
    a fourth gearwheel fixed to the second shaft and engaging the third gearwheel;
    means for fixing the third gearwheel to the first shaft to provide a second forward gear;
    a third shaft arranged in parallel to the first shaft;
    a fifth gearwheel rotatably mounted to the third shaft and in driving connection with the first gearwheel;
    a sixth gearwheel rotatably mounted to the third shaft and in driving connection with the fourth gearwheel; and
    means for connecting the fifth gearwheel and the sixth gearwheel to provide a reverse gear.

2. The gearbox-transmission of claim 1, wherein the fifth gearwheel is in driving connection with the first gearwheel by engaging the second gearwheel, and the sixth gearwheel is in driving connection with the fourth gearwheel by engaging the third gearwheel.

3. The gearbox-transmission of claim 1, further comprising third and fourth forward gears wherein the first forward gear is one of the lower gears and the second forward gear is one of the higher gears.

4. The gearbox-transmission of claim 3, wherein the first forward gear is the lowest forward gear and the second forward gear is the third lowest forward gear.

5. The gearbox-transmission of claim 3, further comprising a fifth forward gear arranged such that a shift lever moves in the same direction when selecting either the fifth forward gear or the reverse gear.

* * * * *